Patented Apr. 4, 1939

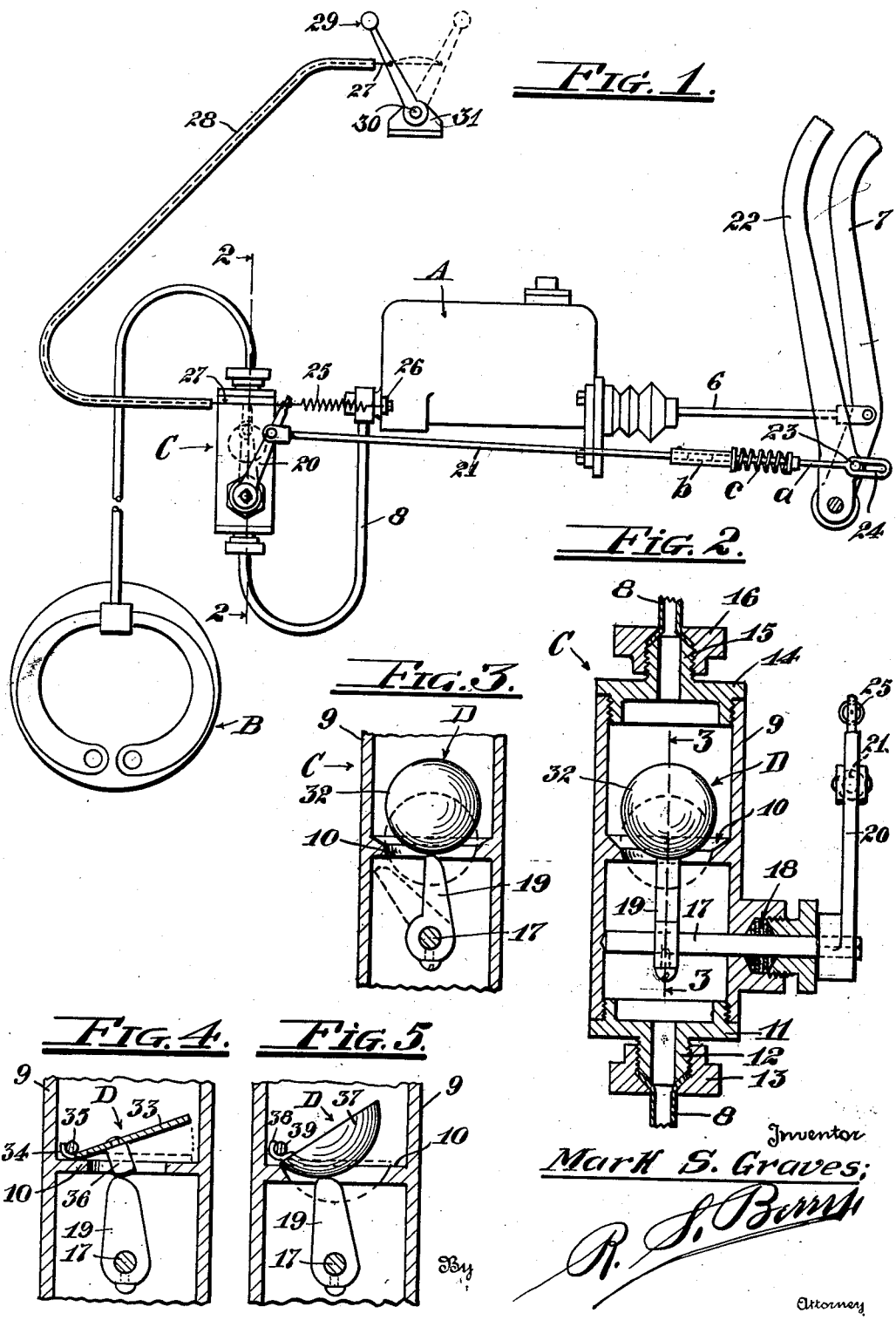

2,152,686

UNITED STATES PATENT OFFICE 2,152,686

BRAKE CONTROL DEVICE

Mark S. Graves, Los Angeles, Calif.

Application November 3, 1937, Serial No. 172,562

1 Claim. (Cl. 192—13)

This invention relates to a device for controlling fluid pressure operated brakes such as are employed on motor vehicles, and more particularly pertains to a device for automatically preventing release of the brakes while the vehicle clutch is in a disengaged position.

An object of the invention is to provide a device of the above character embodying a self-closing control valve arranged in the fluid pressure delivery line of a fluid pressure operated brake system in which the valve is so arranged as to open under the flow of fluid under pressure from the source of pressure supply to the brake mechanism and to automatically close on cessation of the flow of fluid pressure so as to prevent the release of the brakes in event the vehicle clutch is disengaged; the invention embodying a mechanism connected with the clutch operating mechanism for holding the control valve in its open position while the clutch mechanism is engaged and to release the control valve on placing the vehicle clutch in its released position.

Another object of the invention is to provide a control valve of the character above described so mounted and arranged as to be gravity operated to its closed position and which will so operate irrespective of any direction of inclination of the motor vehicle to which it is applied while the latter is in an upright position.

Another object is to provide a construction in the valve opening mechanism where connected with a clutch operated lever whereby on advancing the lever to effect disengagement of the clutch mechanism, the control valve will close almost immediately and which embodies a construction whereby when the valve operating mechanism has reached the limit of its movement on advance of the clutch control lever the latter may continue advancing to the limit of its stroke.

A further object is to provide an arrangement whereby the control valve may be operated and utilized as an emergency brake independent of the clutch control mechanism whereby the vehicle operator may apply the fluid pressure operated brakes as when leaving the vehicle standing; the device then serving to lock the brakes in their applied position until released by manipulation of a secondary manually operated control device, and in which such secondary manual control is so formed and arranged that the vehicle operator may set the control valve in readiness to automatically effect prevention of normal release of the brakes preliminary to effecting application of the latter.

With the foregoing objects in view, together with such other objects and advantages as may subsequently appear, the invention is carried into effect as illustrated by way of example in the accompanying drawing in which:

Fig. 1 is a diagram in side elevation depicting the invention as applied;

Fig. 2 is a view in vertical section taken on the line 2—2 of Fig. 1 showing the construction and mode of operation of the control valve;

Fig. 3 is a detail in section and elevation taken on the line 3—3 of Fig. 2 showing the manner in which the control valve is held in its open position;

Fig. 4 is a detail in section depicting a modified form of the valve structure;

Fig. 5 is a detail in section demonstrating another form of the valve structure.

Referring to the drawing more specifically A indicates generally the master cylinder of a hydraulic brake system which is of the usual type and embodies a cylinder and piston (not shown) for creating a fluid pressure in the system in effecting application of the brakes; the piston being attached to a connecting rod 6 operatively connected to a brake pedal 7.

Leading from the master cylinder A is a fluid conductor 8 which leads to the wheel brakes B (only one being diagrammatically illustrated) in which conductor is arranged a control valve indicated generally at C.

The control valve C embodies an upstanding cylindrical valve housing 9 formed intermediate its ends with a valve seat 10 and fitted with an upwardly opening valve D which is adapted to normally gravitate to a closed position on the seat 10. The housing 9 is fitted at its lower end with a cap 11 formed with a nipple 12 opening to the interior of the lower end portion of the housing and to which nipple is attached by a coupling 13 the length of the conduit 8 leading from the fluid pressure supply in the master cylinder A. The upper end of the housing 9 is fitted with a cap 14 on which is formed a nipple 15 opening to the interior of the upper end portion of the housing 9 and to which nipple is attached by a coupling 16 the portion of the conduit 8 leading to the brakes B.

Means are provided for holding the valve D in an open position which means embodies a rock shaft 17 extending laterally into the housing 9 through a packing gland 18 carried on the latter, and on which shaft is mounted interiorly of the housing 9 an upstanding finger 19 which when disposed in an upright position will serve to prevent the valve D from advancing to its closed position on the valve seat 10, but which finger 19 is adapted on turning the rock shaft 17 to be positioned out of engagement with the valve D to allow the latter to gravitate to its closed position on the seat 10.

The rock shaft 17 is fitted at its outer end with a crank arm 20 to which is attached a link 21 leading to and connecting with a clutch operating lever 22; the connection between the link 21 and lever 22 comprising a pin 23 on the latter extending into a longitudinally extending slot 24 formed on an outer end section $a$ of the link 21 which end section slidably telescopes a tube $b$ formed on the link and to which tube the section $a$ is connected by a helical spring $c$.

Connecting with the upper end of the arm 20 is a pull spring 25 leading from a bracket 26 on the master cylinder A which spring acts to normally maintain the arm 20 in a retracted position with the finger 19 disposed to hold the valve D in an open position. When the arm 20 is in its retracted position the pin 23 on the clutch lever 22 will be disposed at the forward end of the slot 24 as shown in Fig. 1.

Leading from the upper end of the arm 20 opposite the spring 25 is a wire 27 which passes through a supporting tube 28 and connects with an upwardly extending hand lever 29 pivoted at 30 to a suitable support 31, which lever is positioned convenient to the reach of the operator and is arranged for positioning at an upward inclination from its pivot 30 to either side of the vertical.

The valve D preferably embodies a ball 32 as shown in Figs. 2 and 3 formed of steel or other suitable metal of sufficient weight to readily move to its seated position when permitted so to do. However, in some instances the valve D may comprise a leaf valve in the form of a disk 33 as shown in Fig. 4; the disk being formed with a finger 34 engaging a pin 35 on the valve housing 9 to provide a hinged connection with the latter on which the leaf 33 may swing vertically relative to the valve seat 10. A projection 36 is formed on the under side of the disk 33 and positioned to be engaged by the finger 19 on the rock shaft 17 in such manner that when the finger 19 is in its vertically extending position the disk 33 will be held in an open position.

In some instances the valve D may embody a semi-spherical valve body 37 as shown in Fig. 5 which is formed with a hooked finger 38 engaging a pin 39 carried by the housing 9 to afford a pivotal mounting for the valve body 37 so that the latter may swing vertically relative to the valve seat 10. In this instance the rounded under side of the valve body 37 is disposed for engagement by the upper end of the finger 19 on the rock shaft 17 so as to be held in open position when the finger 19 is disposed in its vertical position.

Normally the parts are disposed as shown in full lines in the drawing, that is, with the valve D held in its open position by the upstanding finger 19 under the urge of the spring 25 exerting a pull on the arm 20, that is, while the clutch lever 22 is in the normally retracted position it occupies when the clutch controlled thereby is in its engaged position. While the valve D is thus maintained open flow of the brake operating fluid may occur in either direction through the valve housing 9, but when the valve D is in its closed position such flow is restricted to the direction leading from the master cylinder A to the brakes B. It follows that in the operation of the invention, when the clutch lever 22 is disposed in its normal retracted position with the clutch in its engaged position, and the valve D held in its open position, the vehicle brakes B may be freely applied and released by operation of the brake lever 7 in the usual manner; but on depressing the clutch lever to release the clutch then the rock shaft 17 will be turned by the forward movement of the clutch lever through the link 21, so as to move the finger 19 from beneath the valve D thereby allowing the latter to advance to its closed position. When this occurs and the brakes are applied while the clutch lever is advanced and the clutch is disengaged, release of the brakes will be prevented by reason of the valve D then being closed so as to confine the brake operating fluid in the conduit 8 between the valve and the brakes B, until such time as the clutch lever is released to re-engage the clutch. During forward operation of the clutch lever it may be advanced beyond the extent of the movement necessary to effect closing of the valve D by reason of the resilient connection afforded in the link 21 by the spring $c$ which permits the lever to advance after the arm 20 of the control valve C is brought to rest.

When it is desired to effect closing of the valve D independent of the clutch lever 22, the lever 29 is advanced from the position shown in full lines in Fig. 1 to the position indicated in dotted lines, thereby effecting a pull on the wire 27 such as to advance the valve arm 20 in opposition to the spring 25 and thereby move the finger 19 from beneath the valve D. Forward movement of the arm 20 under this operation is permitted by reason of the pin and slot connection 23—24 between the link 21 and the clutch lever; this connection allowing the link 21 to advance independently of the clutch lever. By thus operating the lever 29 the device will then act as an emergency brake since on then operating foot lever 7 to apply the brakes the latter will be held in their applied position independent of the brake lever 7 and will then be only subject to release on restoring the hand lever 29 to its advanced position. In operating the lever 29 it will be held in its retracted position in opposition to the spring 25 by reason of the connection between the wire 27 and the lever 29 being passed beyond the vertical center of movement of the lever.

In thus utilizing the device as an emergency brake the valve D may be set in readiness for operation to prevent release of the brakes at any time previous to operation of the brake lever 7.

A feature of the invention resides in arranging the valve housing 9 in a vertical position so as to insure the valve D moving under the influence of gravity to a closed position on the valve being released by the finger 19 irrespective of any inclination of the vehicle to which the device is applied in any direction, as long as the vehicle is in an upright position.

It will be understood that the control mechanism herein set forth is applicable for use in brake systems employing either liquid or air as a fluid pressure operating medium.

It is manifest that the spring $c$ has a tension exceeding that of the valve operating spring 25 so that on advance of the clutch lever 22 the spring $c$ will overcome the spring 25.

While I have shown and described a specific embodiment of the invention I do not limit myself to the exact details of construction or arrangement shown but may employ such modifications as come within the purview of the accompanying claim.

I claim:

In a control device for fluid pressure operated brake systems including a conduit for transmission fluid and connecting a source of pressure supply and a brake operating mechanism, an upstanding valve housing in said conduit having a vertically extending passage leading therethrough, an upwardly opening valve in said housing normally closing said passage under the influence of gravity, a rock shaft extending into said housing beneath said valve, a finger on said rock shaft engageable with said valve for holding the latter in its open position, an arm on said rock shaft, a clutch operating lever, connections between said lever and said arm arranged to actuate said rock shaft to move said finger out of engagement with said valve on depression of the lever, and spring means connected to said arm yieldably maintaining said rock shaft disposed with the finger thereon in the valve opening position.

MARK S. GRAVES.